Nov. 8, 1927.

J. A. TAFT 1,648,246

ROUND BALE COMPRESS

Filed June 9, 1924

Inventor
J.A.TAFT.

By

Attorney

Patented Nov. 8, 1927.

1,648,246

UNITED STATES PATENT OFFICE.

JOHN A. TAFT, OF BIRMINGHAM, ALABAMA, ASSIGNOR, BY MESNE ASSIGNMENTS, TO THE DIXIE GIN COMPRESS COMPANY, INC., OF NEW ORLEANS, LOUISIANA, A CORPORATION OF LOUISIANA.

ROUND-BALE COMPRESS.

Application filed June 9, 1924. Serial No. 718,769.

My invention relates to a new and improved process and apparatus for compressing fibrous material, such as cotton and the like, into a round bale of high density without the use of a corebar.

My invention relates to that class of presses which utilize an endless belt or chain in a bight or loop in which the round bale is formed.

In a companion application I have described such a compress which is distinguished by the provision of means for maintaining a positive driving connection at all times between the belt or chain and the rotary elements between and below which the baling bight in the chain or belt is formed. That invention contemplates means for gradually increasing the amount of chain or belt in the bight as the baling action progresses and it results in the formation of a very hard core of the cotton or fibrous material and the compressing of the material, as it were, from the center of the bale outwardly. In other words, the press therein disclosed involved a positively driven baling loop formed in an endless chain or belt with the provision of means for gradually increasing the size of the baling loop during the baling operation.

My present invention is based upon a new theory which is distinguished by the utilization of a loop of constant size for the formation of a bale of a given weight and density. It will be at once apparent that the method of compressing in such a loop is diametrically opposite to that described in my pending application, because according to my present invention the bat, as first fed to the large loop, will commence the formation of the bale practically without pressure and the bale will build up to the full diameter of the loop before it is subjected to any appreciable compression. Therefore as the bat is continuously fed to the rotating bale the compression of the latter increases and the compression is exerted from the outside towards the center, which is the correct and ideal way of effecting the compression of the fibrous material to be baled.

The apparatus of my invention, by virtue of employing the constant size of loop, will be greatly simplified as compared with that of my said application, wherein it was necessary to incorporate means for permitting relative angular movement between the belt drive rotaries to increase the length of the belt in the loop. This is avoided in my present machine.

A further improvemeent in my present baling press is that I have arranged to shorten the requisite relative movement between the belt driving rotaries on each side of the loop by the provision of means which will cause the rotaries as they are moved apart to have relative movement both bodily and angularly, both said movements acting to shorten the loop, and thus, to the extent that the angular movement is so employed, the bodily movement may be shortened.

My invention also comprises the novel details of construction and arrangements of parts, which in their preferred embodiment only are illustrated in the accompanying drawings which form a part of this specification, and in which:—

Similar reference numerals refer to similar parts throughout the drawings.

While it is to be understood that the apparatus for carrying into effect my baling process may be widely varied according to the size or density of the bale desired or of the material to be treated, nevertheless in the embodiment of my invention illustrated, I have shown a typical press suited for the formation of standard round bales of cotton, and this will sufficiently illustrate the essential features of my invention and enable those skilled in the art to adapt them to any particular use desired.

Figure 1:
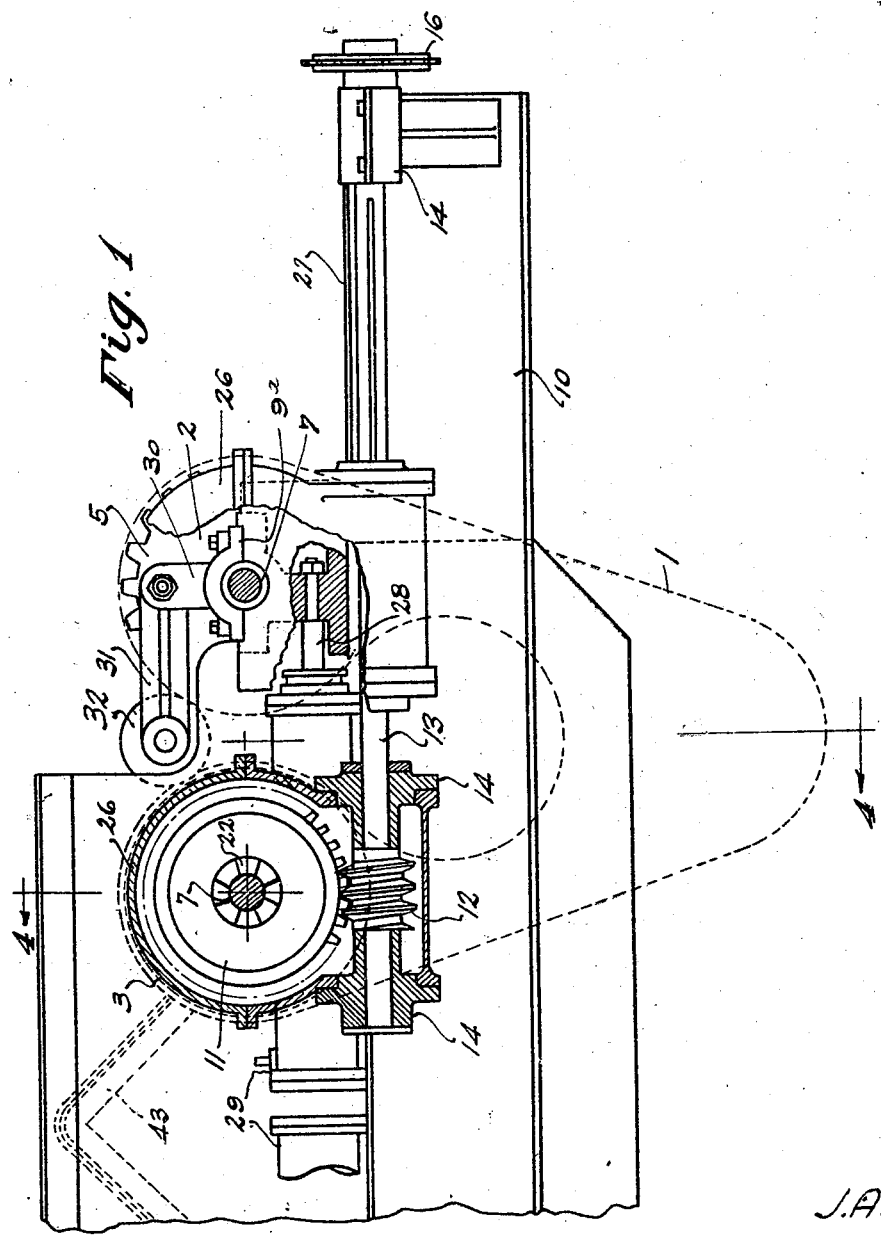
Fig. 1 is a view in side elevation of one side of the press showing the elements assembled for the formation of the bale.

As illustrated, I employ an endless belt 1 driven by two rotaries 2 and 3 which have positive engagement with the belt. The belt may be formed of spaced links or chains 4 to which the cross bars or other elements forming the belt are suitably attached, and the said chains may be adapted to engage sprocket teeth 5 carried by the rotaries. As shown, the rotors comprise each a hub 6 mounted fast on a shaft 7, said hubs carrying a plurality of fast or integral sprocket wheels 8 which engage the several chains 4 and thus afford a very strong positive drive for the belt. The shafts 7 of the belt driving rotors are mounted in suitable bearings 9 and 9a on the frame work 10 of the press and the shafts at one end overhang beyond the bearings and carry thereon a worm wheel 11 meshing a worm 12 on the main power shaft 13, which is mounted in bearings 14 and driven by a sprocket chain 15, which engages a sprocket wheel 16 on the shaft 13 and a sprocket wheel 17 on a pulley 18. The latter shaft is journaled in bearings 19 on the frame of the machine and has a driving pulley 20 on one end and a friction clutch 21 on the other end through which the sprocket wheel 17 is driven. The worm wheel on the stationary rotor shaft 7 is loose, the gear wheel on the sliding rotor shaft 7 being fast. The loose worm wheel is provided with clutch jaws 22 which are adapted to be engaged by the jaws on a clutch sleeve 23 which is keyed to its respective shaft 7 and adapted to be moved by a control arm, not shown, so as to clutch its respective worm wheel 11 fast on the stationary rotor shaft 7 or to disengage it therefrom. A stop coller 25 limits the outward movement of the clutch sleeve 23. The worm drive for each rotor is all contained within worm housing 26. As illustrated, the bearings 9 for one of the rotors, above referred to as the stationary rotor, is mounted fast on the press frame 10 while the bearings 9a for the other or sliding rotor are mounted to slide on tracks 27 on the press frame and are connected to pistons 28 of the cylinders 29 mounted fast on the press frame and preferably has an integral part of the bearings 9 on each side. These cylinders are charged with an incompressible fluid and act as hydraulic rams to move the rotors 2 and 3 apart and to hold them fixedly in their operating position throughout the baling operation, as shown in Fig. 1. Inasmuch as the hydraulic rams and their method of operation and control is identical with the construction described in my pending application aforesaid, no further detail description of the same will be given herein, it not being material how the rollers 2 and 3 are held fixedly in operating position or moved apart.

The bearings 9a carry upright brackets 30 to which are pivotally mounted hanger arms 31 for the press rotor 32. This is adapted to swing down between the rotors 2 and 3 in their operating position and guide the bat into the bale forming loop.

On the end of the shaft 7 of the stationary rotor I mount fast a gear wheel 36 and this is adapted to mesh a tooth rack 37 made fast at one end to the opposite sliding bearing 9a and supported at its other end on a guide roller 38 mounted in the lower U-shaped end 39 of a rocker arm 40 which is pivotally connected by a pin 41 to a bracket 42 made fast to the press frame. By rocking this arm 40 on its pin 41 the rack 37 may be moved into and out of mesh with the gear wheel 36, as may be desired. Obviously the rack will be out of mesh during the press operation and will be brought into mesh only when the rollers 2 and 3 are to be moved apart for delivering the finished bale. When the rollers are thus moved apart the engagement of the rack and gear will rotate the stationary rotor 3 in a clockwise direction, Fig. 2, thus withdrawing the belt from the baling loop, while the bodily movement of the sliding roller 2 from the roller 3 will also withdraw the belt from the baling loop and bring it to the position shown in Fig. 2, in which it will support the finished bale in convenient position for removal from the press.

Figure 2:
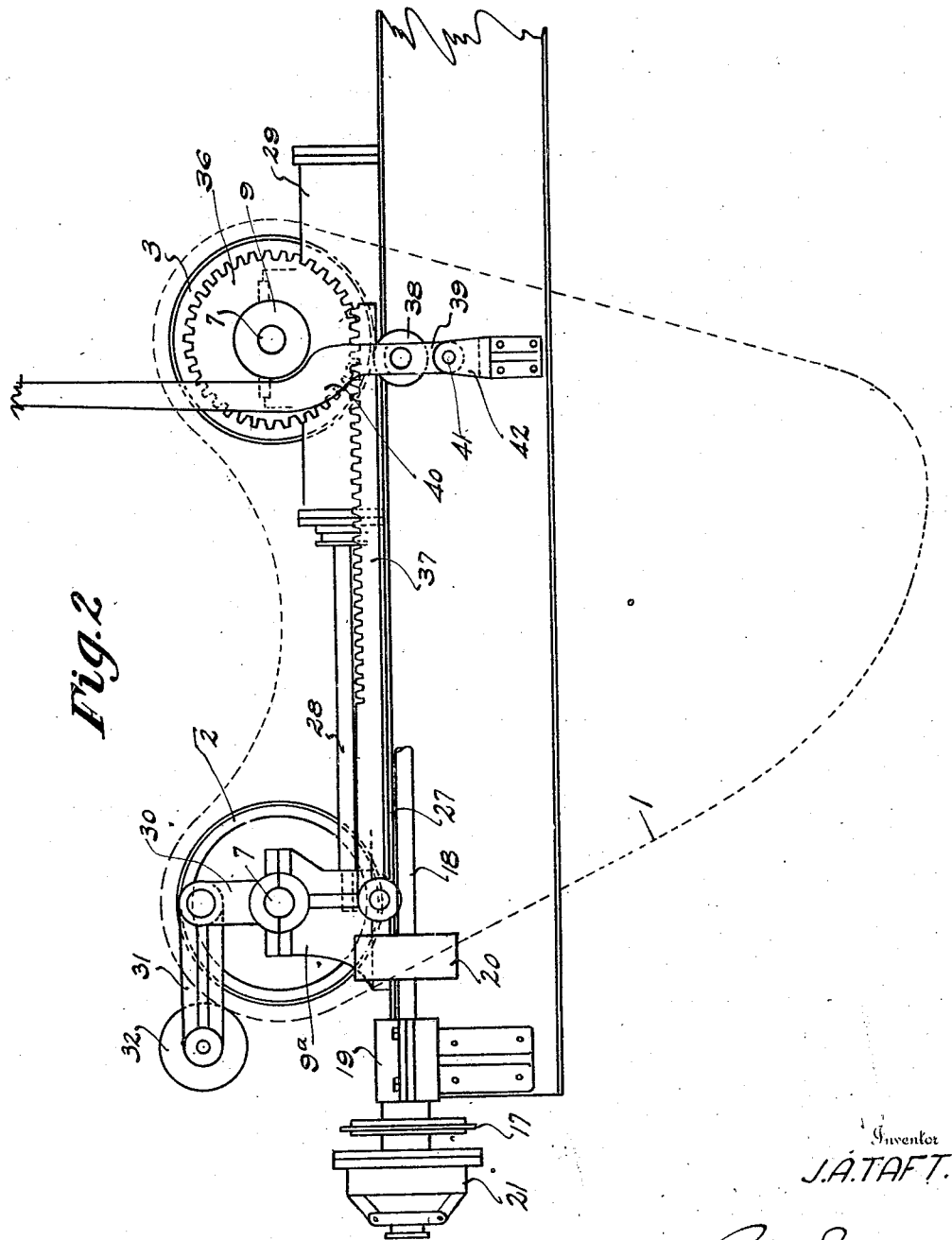
Fig. 2 is a reverse view of Fig. 1 showing the parts in position in the discharge of the finished bale.
Figure 3:
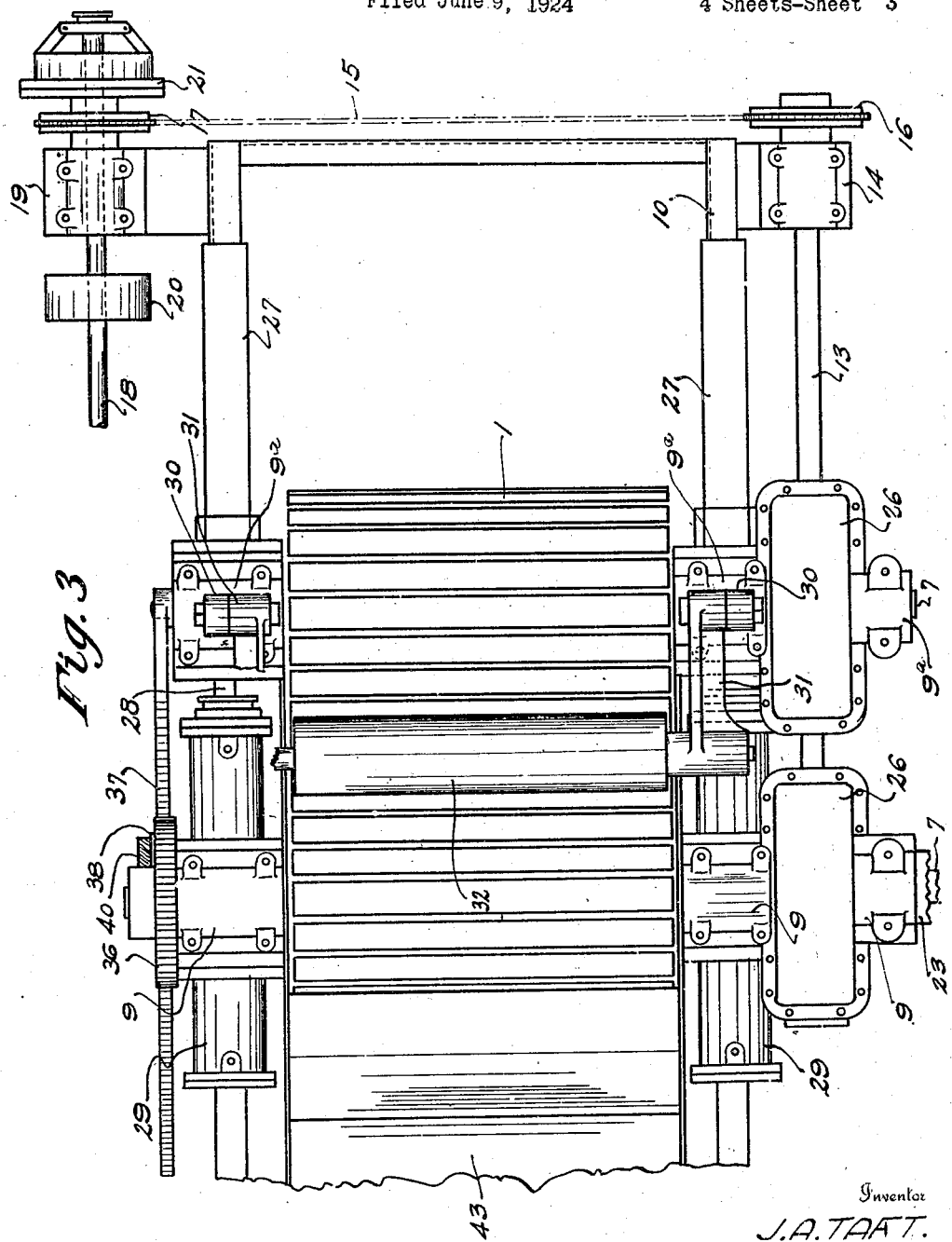
Fig. 3 is a plan view of Fig. 1.
Figure 4:
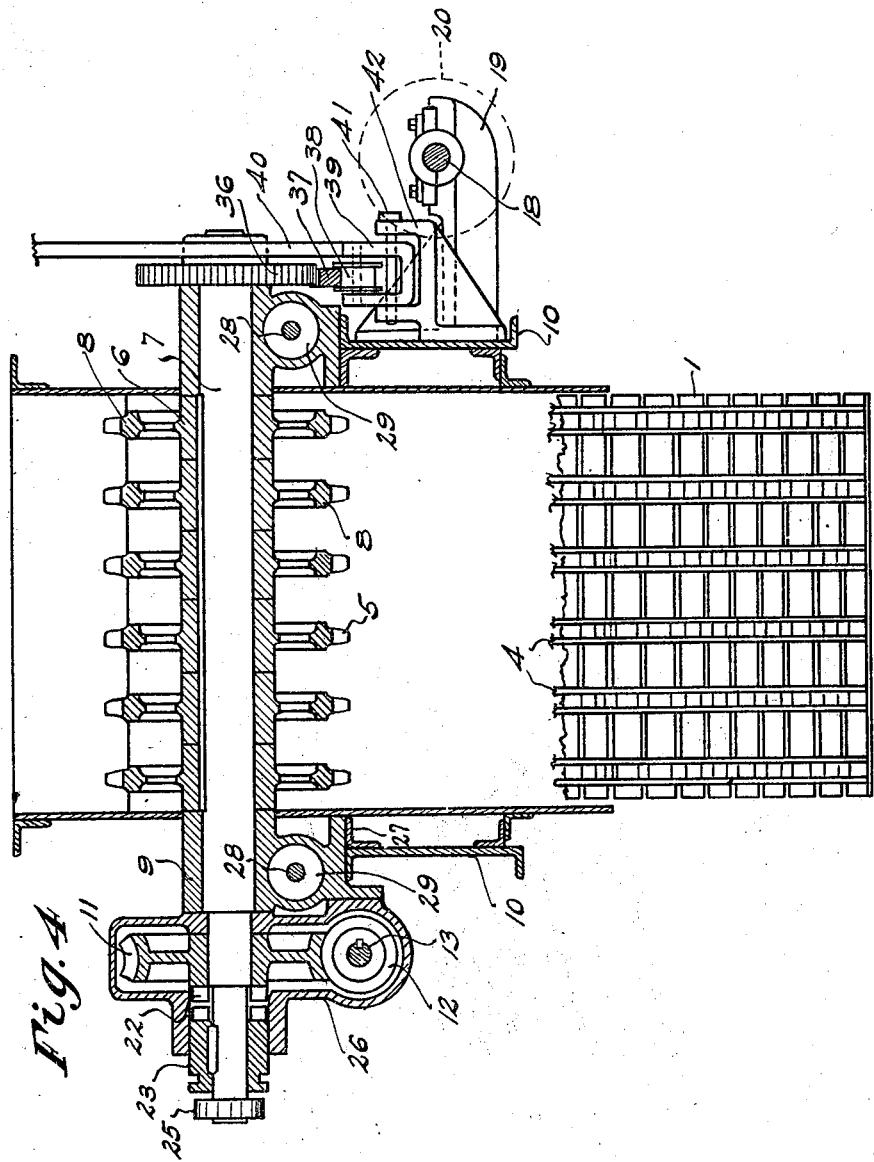
Fig. 4 is a cross-sectional view taken on the line 4—4 of Fig. 1.

The operation of forming a round lapped bale in accordance with my press process and with the apparatus as hereinabove described is as follows:

Assuming the parts in the position shown in Fig. 2, the hydraulic ram is operated to bring the rotors 2 and 3 back to the position shown in Fig. 1, and in doing this the rotor 3 by the action of the rack on gear 36 will turn counter-clockwise so as to return the baling loop the full amount of the belt to be used in the belt operation. This belt at the commencement of the operation will of course hang freely from the adjacent peripheries of the rotors 2 and 3 and the presser roller 32 will be swung to its operating position resting on the rollers. The bat of cotton or other fibrous material to be compressed is fed down a chute 43 from the condenser to the stationary roller 3, which latter, as shown in Fig. 1, is turning clockwise in the same direction with the roller 2. The bat is carried over the rotary 3 and under the presser roller 32 and passes down into the baling loop of the belt, where is passes to the bottom of the loop, the sides of which are then hanging freely from the adjacent peripheries of the rolls 2 and 3. The bat will be wound upon itself by reason of the action thereon of the traveling wall of the belt loop and will continue to wind itself up loosely until the loop is distended and assumes the shape approximately as shown in Fig. 1. As this occurs a gradually increasing pressure is applied to the lapped roll and after the baling loop becomes fully distended this pressure increases in direct proportion to the mass of material being lapped onto the bale. As a result the pressure is always exerted from the outside inwardly and is transmitted from the belt through the entering bat to the previously rolled bat and thus the pressure is distributed uniformly and radially towards the center of the bale and when the bale is completed its density will be practically uniform throughout and it will be free from hard rolled center. When the bale is finished the rack 37 is raised into engagement with the gear 36 and the hydraulic rams are operated to separate the rollers 2 and 3 by relative movement of the former away from the latter and by the angular rotation of the latter while the roll 2 is held against rotation. As a result of these two actions the belt will be withdrawn from the loop and the bale presented in a shallow bight, as shown in Fig. 2, from whence it can be readily removed.

In its broadest aspect, my invention contemplates first forming a loose bale having approximately the size of the finished bale and compressing this loose bale by the addition of fibrous material about its rotating periphery while restraining its further enlargement by the walls of a baling loop. More particularly I gradually compress the loose rotating bale by the winding of a bat about it within a confining baling chamber which is not intended to increase in size to any material extent as the density of the bale increases.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

Having thus described my invention, what I claim as new and desire to secure by Letters Patent, is:—

1. The herein described process for the production of round bales of fibrous material, which consists in first producing a loose bale of the desired finished bale diameter and compressing it by the application of successive layers of the fibrous material about it without substantially increasing its diameter.

2. The herein described process for the production of round bales of fibrous material, which consists in first producing a loose bale of the desired finished bale diameter and compressing it gradually from the outside inwardly by the winding of a continuous bat of fibrous material about it within a confining chamber.

3. A round bale press comprising an endless belt, relatively movable rotors for positively driving said belt with a baling loop between them, means to maintain said loop of substantially constant size throughout the baling operation, and means to deliver a bat of material to be baled into said baling loop.

4. In a round bale press, an endless belt, a pair of relatively movable rotors having positive driving engagement with said belt which forms a baling loop depending from and between said rotors, and means to rotate a rotor responsive to relative movement between the rotors, as and for the purposes described.

5. In a round bale press, an endless belt, a pair of similar relatively movable rotors for positively driving said belt, positive means for driving both rotors uniformly and in the same direction throughout the baling operation, and means to hold said rotors against relative movement during the baling operation, thereby maintaining the baling loop formed in the belt between the rollers of substantially constant size.

6. In a round bale press, an endless belt, a pair of similar rotors adapted positively to drive said belt with a baling loop formed therein between and below the rotors, means to drive said rotors, means to disconnect one rotor from its drive, relatively movable bearings for said rotors, and means to rotate the loose rotor responsive to relative movement of the rotor bearings.

7. In a round bale press according to claim 6, in which the means to rotate the loose rotor comprises a pinion rotatable with the loose rotor, a rack movable responsive to relative movement of the rotor bearings, and means to engage and disengage said rack and pinion.

8. The herein described process for the production of round bales of fibrous material in feeding continuously a bat of fibrous material into a confining chamber formed by flexible traveling walls, and regulating the density of the finished bale by maintaining of constant length the traveling walls within which the bat is coiled in forming the bale.

In testimony whereof I affix my signature.

JOHN A. TAFT.